United States Patent
Paynter et al.

(10) Patent No.: US 11,111,786 B2
(45) Date of Patent: Sep. 7, 2021

(54) MOISTURE TOLERANT ROCK DUST AND METHODS OF APPLICATION THEREOF

(71) Applicant: Imerys USA, Inc., Roswell, GA (US)

(72) Inventors: Christopher Paynter, Atlanta, GA (US); Douglas Wicks, Johns Creek, GA (US); David Anstine, Canton, GA (US)

(73) Assignee: Imerys USA, Inc., Roswell, GA (US)

( * ) Notice: Subject to any disclaimer, the term of this patent is extended or adjusted under 35 U.S.C. 154(b) by 85 days.

(21) Appl. No.: 15/518,711

(22) PCT Filed: Oct. 23, 2015

(86) PCT No.: PCT/US2015/057096
§ 371 (c)(1),
(2) Date: Apr. 12, 2017

(87) PCT Pub. No.: WO2016/065250
PCT Pub. Date: Apr. 28, 2016

(65) Prior Publication Data
US 2017/0226854 A1      Aug. 10, 2017

Related U.S. Application Data

(60) Provisional application No. 62/068,309, filed on Oct. 24, 2014.

(51) Int. Cl.
E21F 5/08      (2006.01)
E21F 5/12      (2006.01)
C09K 3/22      (2006.01)

(52) U.S. Cl.
CPC ............... E21F 5/08 (2013.01); C09K 3/22 (2013.01); E21F 5/12 (2013.01)

(58) Field of Classification Search
CPC ...................... E21F 5/08; C09K 3/22
See application file for complete search history.

(56) References Cited

U.S. PATENT DOCUMENTS

| | | | | |
|---|---|---|---|---|
| 4,971,720 A * | 11/1990 | Roe | | C04B 7/48 241/15 |
| 8,267,482 B1 * | 9/2012 | Hall | | B02C 21/026 299/39.4 |
| 2003/0146410 A1 * | 8/2003 | Gay | | C09K 3/22 252/88.1 |
| 2004/0195545 A1 * | 10/2004 | Gay | | A62D 1/0014 252/88.1 |
| 2011/0159290 A1 * | 6/2011 | Khanna | | C09C 1/021 428/403 |
| 2012/0111583 A1 * | 5/2012 | Brown | | E21F 5/12 169/45 |
| 2012/0181051 A1 | 7/2012 | Masloff et al. | | |
| 2012/0256020 A1 * | 10/2012 | Masloff | | E21F 5/10 239/654 |
| 2013/0277072 A1 * | 10/2013 | VanBuren | | E21F 5/10 169/44 |
| 2013/0337181 A1 * | 12/2013 | Wolff | | B08B 17/00 427/385.5 |
| 2014/0193642 A1 * | 7/2014 | Anstine | | E21F 5/12 428/402 |

FOREIGN PATENT DOCUMENTS

| | | | | |
|---|---|---|---|---|
| AU | 2013/260691 A1 | 5/2015 | | |
| WO | WO-2010030579 A1 * | 3/2010 | ............ | C09C 1/021 |
| WO | WO 2014/110202 A1 | 7/2014 | | |
| WO | WO-2014110202 A1 * | 7/2014 | ............ | C01F 11/185 |

OTHER PUBLICATIONS

International Search Report and Written Opinion dated Jan. 14, 2016, in International Application No. PCT/US2015/057096 (12 pgs.).
US Department of Labor Mine Safety and Health Administration; "Dust—What You Can't See Can Hurt You!"; National Mine Health and Safety Academy Training Material. 1999, p. 22, first paragraph, (pp. 1-27).

* cited by examiner

*Primary Examiner* — Dah-Wei D. Yuan
*Assistant Examiner* — Kristen A Dagenais-Englehart
(74) *Attorney, Agent, or Firm* — Finnegan, Henderson., Farabow, Garrett & Dunner, LLP

(57) ABSTRACT

Compositions and methods of using rock dust are disclosed. A mine rock dust may be capable of being applied in a wet form. A moisture tolerant mine rock dust may include a hydrophobic inorganic particulate material. A moisture tolerant mine rock dust may be capable of being dispersed by a light blast of air. A method may include applying a mine rock dust at a concentration having little or no respirable mine rock dust. A method of applying a mine rock dust may include applying a mine rock dust in a wet form. The mine rock dust may be applied at a concentration having little or no respirable mine rock dust. The mine rock dust may include a hydrophobic inorganic particulate material.

13 Claims, No Drawings

MOISTURE TOLERANT ROCK DUST AND METHODS OF APPLICATION THEREOF

This application is a U.S. national phase entry under 35 U.S.C. § 371 from PCT International Application No. PCT/US2015/057096, filed Oct. 23, 2015 which claims the benefit of priority of U.S. Provisional Patent Application No. 62/068,309, filed Oct. 24, 2014, to both of which this application claims the benefit of priority and the entirety of the subject matter of both, of which is incorporated herein by reference.

FIELD OF DISCLOSURE

Disclosed herein are compositions and methods for applying moisture tolerant rock dust for use to abate explosions in mines, such as coal mines.

BACKGROUND OF THE DISCLOSURE

For many years limestone-based rock dust has been the mine rock dust of choice for explosion abatement. Typically limestone mine rock dusts are readily available throughout North America and prevent the propagation of an explosion when applied in a proper manner to all mine surfaces and used in the correct proportion to the coal dust generated during the mining process.

However, in 2011, the National Institute of Occupation Safety and Health (NIOSH) reported that examinations of rock dust samples tended to cake when wetted and subsequently dried. The report revealed that the examined samples formed cakes and were not easily dispersed with the subjective requirement of a "light blast of air." The rock dust samples NIOSH analyzed contained very fine (e.g., less than 10 microns) particles. Fine particles enhance the caking potential of rock dust when wetted.

The application of mine rock dust in a "dry" form results in the presence of respirable dust in the mine. Thus, the mines need to be vacated by miners, which leads to production inefficiencies and productivity losses in the mines while the miners apply the dust and wait for it to settle. In an effort to reduce the losses in productivity, mine rock dust has been applied in a "wet" form so that respirable dust is not formed. However, when mine rock dust is applied in wet form, it forms a cake as it dries that is not easily dispersible and is insufficient to abate explosions or render them explosively inert. Furthermore, a secondary application with a "dry" mine rock dust is still needed, leading to lost production time because the miners must vacate the area. This two-step application of mine rock dust is also subject to caking.

Therefore, it may be desirable to provide a modified mine rock dust that can be applied with little or no respirable mine rock dust.

SUMMARY OF THE DISCLOSURE

In the following description, certain aspects and embodiments will become evident. It should be understood that the aspects and embodiments, in their broadest sense, could be practiced without having one or more features of these aspects or embodiments. It should be understood that these aspects and embodiments are merely exemplary.

According to an aspect of this disclosure, a composition may include a mine rock dust capable of being applied in a wet form. The mine rock dust may render coal dust explosively inert.

According to another aspect, a composition may include a mine rock dust slurry. The mine rock dust slurry may render coal dust explosively inert. The mine rock dust slurry may render coal dust explosively inert when applied to a coal mine surface.

According to another aspect, a method of applying a mine rock dust may include applying a mine rock dust at a concentration having little or no respirable mine rock dust. The mine rock dust may include a hydrophobic inorganic particulate material.

According to another aspect, a method of inerting coal dust may include applying a mine rock dust in a wet form. The mine rock dust may include a hydrophobic inorganic particulate material.

According to a further aspect, a method of applying a mine rock dust may include applying a mine rock dust in a wet form at a concentration having little or no respirable mine rock dust. The mine rock dust may render coal dust explosively inert.

According to still another aspect, a composition may include a moisture tolerant mine rock dust that may include a hydrophobic inorganic particulate material.

According to still another aspect, a composition may include a moisture tolerant mine rock dust capable of being dispersed by a light blast of air. The mine rock dust may include an inorganic particulate material having a hydrophobic treatment.

DESCRIPTION OF EXEMPLARY EMBODIMENTS

Reference will now be made in detail to exemplary embodiments.

According to some embodiments, a composition may include a mine rock dust capable of being applied in a wet form.

According to some embodiments, a composition may include a mine rock dust slurry. The mine rock dust slurry may render coal dust explosively inert. For example, the mine rock dust slurry may render coal dust explosively inert when applied to a coal mine surface.

According to some embodiments, a method of applying a mine rock dust may include applying a mine rock dust at a concentration having little or no respirable mine rock dust. The mine rock dust may include a hydrophobic inorganic particulate material.

According to some embodiments, a method of inerting coal dust may include applying a mine rock dust in a wet form. The mine rock dust may include a hydrophobic inorganic particulate material.

According to some embodiments, a method of applying a mine rock dust may include applying a mine rock dust in a wet form at a concentration having little or no respirable mine rock dust. The mine rock dust may render coal dust explosively inert. For example, the mine rock dust may render coal dust explosively inert when applied to a coal mine surface.

According to some embodiments, a composition may include a moisture tolerant mine rock dust including a hydrophobic inorganic particulate material.

According to some embodiments a composition may include a moisture tolerant mine rock dust capable of being dispersed by a light blast of air. The mine rock dust may include an inorganic particulate material having a hydrophobic treatment.

According to some embodiments, a moisture tolerant mine rock dust may include a mine rock dust that is capable of being dispersed by a light blast of air after the mine rock dust has been, for example, wetted, slurried, or applied in a foamed composition. According to some embodiments, the moisture tolerant mine rock dust may also be capable of being dispersed by a light blast of air after the mine rock dust after a wet form of the mine rock dust has at least partially dried. A moisture tolerant mine rock dust may include a mine rock dust that is capable of rendering coal dust explosively inert, such as shown by an explosibility test, after the mine rock dust has been, for example, wetted, slurried, or applied in a foamed composition. According to some embodiments, the moisture tolerant mine rock dust may also be capable of rendering coal dust explosively inert after a mine rock dust after the wet form of the mine rock dust has at least partially dried. A moisture tolerant mine rock dust may include a hydrophobic inorganic particulate material, such as, for example, an inorganic particulate material having a surface treatment that imparts hydrophobic properties.

In particular embodiments, the inorganic particulate material may include calcium carbonate, such as, for example, marble or limestone (e.g., ground calcite or ground dolomite). In some embodiments, the inorganic particulate material may include lime. Hereafter, certain embodiments of the invention may tend to be discussed in terms of calcium carbonate, and in relation to aspects where the calcium carbonate is processed and/or treated. The invention should not be construed as being limited to such embodiments. For instance, calcium carbonate may be replaced, either in whole or in part, with, for example, talc or lime.

According to some embodiments, a mine rock dust may be applied in a "wet" form. Exemplary wet forms of applying a mine rock dust include, but are not limited to, mixing the mine rock dust with water prior to applying the mine rock dust, applying the mine rock dust in the form of a slurry, or applying the mine rock dust to a wet surface, or applying the mine rock dust as a part of a foamed composition. According to some embodiments a slurry including the mine rock dust may be an aerated slurry.

According to some embodiments, the mine rock dust may be included as part of a foamed or aerated composition. A foamed composition may be created through, for example, the use of a surfactant or a foaming agent. Foaming agents may include, but are not limited to, laurel ether sulfates, sulfates of fatty alcohol ethoxylates, sulfate esters of fatty alcohols, sulfates of fatty acids, sulfonates of fatty acids, ethoxylates of fatty acids, carboxylates of fatty acids, alkanolamides, alkanolamines, alkylaryl sulfonates, polyethylene oxide-polypropylene oxide block copolymers, alkylphenol ethoxylates, fluorocarbon containing surfactants, olefin sulfonates, olefin sulfates, hydrolyzed proteins, and mixtures thereof. An aerated composition may be created, for example, by adding a gas to a slurry or foamed composition containing the mine rock dust.

According to some embodiments, aeration of a slurry or foaming of a composition can be achieved by mixing or adding a gas to the slurry or composition. In some embodiments, the gas may include air. In some embodiments, the gas may include an inert or relatively inert gas, such as, for example, nitrogen gas or argon gas. The gas may be supplied from the surrounding atmosphere, such as through an air compressor, or from storage tanks, such as, for example, compressed air or compressed gas storage tanks. According to some embodiments, a foamed composition may include a foamed slurry.

According to some embodiments, a wet form of a mine rock dust, such as, for example, a slurry or foamed composition, may have a sufficient ratio of solids content to moisture content to allow the wet form to be applied to a surface of a mine.

According to some embodiments, a wet form of a mine rock dust may have a moisture content in a range from about 5% to about 60% by weight of the wet form of the mine rock dust. For example, a wet form of a mine rock dust may have a moisture content in a range from about 10% to about 40% by weight of the wet form of the mine rock dust, such as, for example, in a range from about 20% to about 40% by weight, from about 20% to about 30% by weight, from about 25% to about 35% by weight, or from about 30% to about 40% by weight of the wet form of the mine rock dust.

According to some embodiments, a mine rock dust slurry may have a moisture content in a range from about 5% to about 60% by weight of the mine rock dust slurry. For example, a mine rock dust slurry may have a moisture content in a range from about 10% to about 50% by weight of the mine rock dust slurry, such as, for example, in a range from about 10% to about 40% by weight, from about 20% to about 40% by weight, from about 20% to about 30% by weight, from about 25% to about 35% by weight, from about 30% to about 40% by weight, or from about 35% to about 45% by weight of the mine rock dust slurry.

According to some embodiments, a foamed composition including a mine rock dust may have a moisture content in a range from about 5% to about 60% by weight of the foamed composition. For example, the foamed composition may have a moisture content in a range from about 10% to about 50% by weight of the foamed composition, such as, for example, in a range from about 10% to about 40% by weight, from about 20% to about 40% by weight, from about 20% to about 30% by weight, from about 25% to about 35% by weight, from about 30% to about 40% by weight, or from about 35% to about 45% by weight of the foamed composition.

According to some embodiments, a wet form of a mine rock dust may have a solids content in a range from about 45% to about 90% by weight of the wet form of the mine rock dust, such as, for example, in a range from about 50% to about 90% by weight, from about 55% to about 90% by weight, from about 50% to about 80% by weight, from about 55% to about 65% by weight, from about 60% to about 90% by weight, from about 60% to about 80% by weight, from about 65% to about 75% by weight, or from about 60% to about 70% by weight of the wet form of the mine rock dust.

According to some embodiments, a mine rock dust slurry may have a solids content in a range from about 45% to about 90% by weight of the mine rock dust slurry, such as, for example, in a range from about 50% to about 90% by weight, from about 55% to about 90% by weight, from about 50% to about 80% by weight, from about 55% to about 65% by weight, from about 60% to about 90% by weight, from about 60% to about 80% by weight, from about 65% to about 75% by weight, or from about 60% to about 70% by weight of the mine rock dust slurry.

According to some embodiments, a foamed composition including a mine rock dust may have a solids content in a range from about 45% to about 90% by weight of the foamed composition, such as, for example, in a range from about 50% to about 90% by weight, from about 55% to about 90% by weight, from about 50% to about 80% by weight, from about 55% to about 65% by weight, from about 60% to about 90% by weight, from about 60% to about 80% by weight, from about 65% to about 75% by weight, or from about 60% to about 70% by weight of the foamed composition.

According to some embodiments, applying a mine rock dust in a wet form may include applying a dry or wetted mine rock dust to a wet surface. When the mine rock dust is applied to a wet surface, water on the surface may act to wet the mine rock dust composition or may be drawn or absorbed into the spaces between the mine rock dust particles. This may have the effect of wetting the mine rock dust particles.

According to some embodiments, the mine rock dust may be sprayed or applied in a wet form to one or more surfaces of the mine. For example, the mine rock dust may be applied to the roof, rib, walls, or floor of a mine. Exemplary apparatuses for applying mine rock dust in a wet form may include, for example, apparatuses having a storage tank or reservoir for holding the mine rock dust in dry or slurry form and a pump to apply the mine rock dust to a mine surface. Some apparatuses may include a liquid reservoir and a mixer to mix a liquid with the mine rock dust to create a slurry or foamed composition of mine rock dust. The apparatus may also include components for aerating or foaming a slurry, such as air compressors or gas storage tanks, along with associated equipment to introduce the gas to the mine rock dust slurry or to introduce a foaming agent to the mine rock dust or a mine rock dust slurry. It is contemplated that any suitable equipment may be used to apply the mine rock dust in either wet or dry form. Some examples of suitable mine rock dust application equipment are disclosed in U.S. Pat. No. 8,584,974, although other suitable equipment is contemplated by this disclosure.

According to some embodiments, application of a mine rock dust in wet form may mitigate, reduce, or eliminate the amount of airborne particles that result from the application process. This may prevent the need to vacate miners from the mine during the spray application and may lead to increased efficiencies in the mining operations. Application of a dry layer of mine rock dust may require the mine to be vacated of miners, which decreases the efficiency of the mining operation and increases down time. Applying a moisture tolerant mine rock dust in a wet form may mitigate or prevent the need to apply a layer of a dry mine rock dust, thereby reducing the down time and inefficiencies that may result from rock dust applications.

Without wishing to be bound by a particular theory, it is believed that wet application of a moisture tolerant mine rock dust, such as, for example, a mine rock dust having a treated component or a hydrophobic component, may preclude need to vacate the mine during application of the mine rock dust. The application of a moisture tolerant mine rock dust in a wet form may also prevent or mitigate the need to apply a layer of dry mine rock dust over a wet mine rock dust. According to some embodiments, the mine rock dust may be applied without having to apply a dry layer of mine rock dust over the wet layer.

According to some embodiments, the mine rock dust may be applied such that little or no respirable mine rock dust is present during application of the dust. "Little or no respirable mine rock dust," as used herein, means that the mine rock dust is applied at a concentration such that the mine does not need to be vacated by miners during the application.

According to some embodiments, the concentration of respirable mine rock dust during application may be less than or equal to about 3.0 mg/m$^3$. For example, the concentration of respirable mine rock dust during application may be less than or equal to about 2.5 mg/m$^3$, less than or equal to about 2.0 mg/m$^3$, less than or equal to about 1.5 mg/m$^3$, less than or equal to about 1.0 mg/m$^3$, less than or equal to about 0.5 mg/m$^3$, less than or equal to about 0.4 mg/m$^3$, less than or equal to about 0.3 mg/m$^3$, or less than or equal to about 0.2 mg/m$^3$. According to some embodiments, a concentration of respirable mine rock dust may be measured by a continuous personal dust monitor (CPDM).

According to some embodiments, the mine rock dust may be applied in an amount in a range from about 10 lbs/ft$^3$ to about 65 lbs/ft$^3$, such as, for example, from about 20 lbs/ft$^3$ to about 65 lbs/ft$^3$, from about 20 lbs/ft$^3$ to about 50 lbs/ft$^3$, from about 20 lbs/ft$^3$ to about 40 lbs/ft$^3$, from about 30 lbs/ft$^3$ to about 65 lbs/ft$^3$, from about 30 lbs/ft$^3$ to about 50 lbs/ft$^3$, or from about 40 lbs/ft$^3$ to about 65 lbs/ft$^3$.

According to some embodiments, the mine rock dust slurry may be applied in an amount such that the amount of mine rock dust applied is in a range from about 10 lbs/ft$^3$ to about 65 lbs/ft$^3$, such as, for example, from about 20 lbs/ft$^3$ to about 65 lbs/ft$^3$, from about 20 lbs/ft$^3$ to about 50 lbs/ft$^3$, from about 20 lbs/ft$^3$ to about 40 lbs/ft$^3$, from about 30 lbs/ft$^3$ to about 65 lbs/ft$^3$, from about 30 lbs/ft$^3$ to about 50 lbs/ft$^3$, or from about 40 lbs/ft$^3$ to about 65 lbs/ft$^3$.

According to some embodiments, the foamed composition may be applied in an amount such that the amount of mine rock dust applied is in a range from about 10 lbs/ft$^3$ to about 65 lbs/ft$^3$, such as, for example, from about 20 lbs/ft$^3$ to about 65 lbs/ft$^3$, from about 20 lbs/ft$^3$ to about 50 lbs/ft$^3$, from about 20 lbs/ft$^3$ to about 40 lbs/ft$^3$, from about 30 lbs/ft$^3$ to about 65 lbs/ft$^3$, from about 30 lbs/ft$^3$ to about 50 lbs/ft$^3$, or from about 40 lbs/ft$^3$ to about 65 lbs/ft$^3$.

The wet application of a mine rock dust having a hydrophobic inorganic particulate material, such as, a treated inorganic particulate material, may improve the properties of the mine rock dust, such as, for example, by making the mine rock dust more tolerant to moisture. For example, a treated inorganic particulate material may reduce or prevent the amount of caking that occurs as the wet-applied mine rock dust dries or as a foamed composition breaks down. Without wishing to be bound by a particular theory, the properties resulting from the treatment of the inorganic particulate material, such as, for example, hydrophobic properties, may prevent the mine rock dust from caking as it dries. According to some embodiments, a mine rock dust having a treated inorganic particulate material may also prevent or reduce the rate at which a foamed composition or aerated slurry containing a mine rock dust breaks down and/or prevent caking of the mine rock dust as a foamed composition or aerated slurry breaks down.

According to some embodiments, a moisture tolerant mine rock dust may include a hydrophobic mine rock dust. A moisture tolerant or hydrophobic mine rock dust may include a mine rock dust treated with a hydrophobic surface treatment. A moisture tolerant or hydrophobic mine rock dust may prevent or reduce caking of the particles after the wetted or slurried mine rock dust dries, the foamed composition breaks down, or an aerated composition, such as an aerated slurry, deaerates and dries. By reducing or mitigating the formation of a cake, the mine rock dust having a treated inorganic particulate material may increase the dispersion or dispersibility of the mine rock dust after it dries, such that the mine rock dust can be dispersed with a light blast of air. By reducing or mitigating the formation of a cake as it dries, the mine rock dust may also explosively inert or abate coal dust.

According to some embodiments, the mine rock dust may be applied in an amount sufficient to render coal dust explosively inert. The effectiveness of certain embodiments of the mine rock dust in inerting coal dust may be shown by explosibility tests, such as, for example, the 20-L explosibility test or ASTM E1515. According to some embodiments, the mine rock dust may pass a 20-L explosibility test. According to some embodiments, the mine rock dust may satisfy ASTM E1515. According to some embodiments, the mine rock dust may render coal dust explosively inert or may abate explosions of coal dust.

According to some embodiments, the mine rock dust may render the coal dust inert when the mine rock dust is in a wet form. According to some embodiments, the mine rock dust may render the coal dust inert after the mine rock dust has dried after being applied in a wet form. According to some embodiments, the mine rock dust may render the coal dust inert after applying the mine rock dust in a wet form, but where the mine rock dust still retains some of the moisture of the wet-application. According to some embodiments, the mine rock dust may render the coal dust inert after applying the mine rock dust in a wet form but has partially dried, substantially dried, or completely dried.

According to some embodiments, a moisture tolerant mine rock dust may include a hydrophobic inorganic particulate material. A hydrophobic inorganic particulate material may include, for example, an inorganic particulate material having a hydrophobic treatment. The hydrophobic treatment may include at least one surface treatment that may impart hydrophobic or water-repellant properties to the inorganic particulate material. A surface treatment imparting hydrophobic properties may also be referred to as a hydrophobic treatment or a hydrophobic surface treatment.

In certain embodiments, at least one surface treatment is used to modify the surface of the inorganic particulate material. In one embodiment, the at least one surface treatment at least partially chemically modifies the surface of the inorganic particulate material by way of at least one surface treating agent. Chemical modification includes, but is not limited to, covalent bonding, ionic bonding, and "weak" intermolecular bonding, such as van der Waals' interactions. In some embodiments, the at least one surface treatment at least partially physically modifies the surface of the inorganic particulate material. Physical modification includes, but is not limited to, roughening of the material surface, pitting the material surface, or increasing the surface area of the material surface. In further embodiments, the at least one surface treatment at least partially chemically modifies and at least partially physically modifies the surface of the inorganic particulate material. In yet other embodiments, the at least one surface treatment is any chemical or physical modification to the surface of the inorganic particulate material.

In certain embodiments, the at least one fatty acid, salt thereof, or ester thereof may be one or more fatty acid, salt thereof, or ester thereof with a chain length of C16 or greater. The fatty acid may, for example, be stearic acid.

In some embodiments, the at least one surface treatment silanizes the inorganic particulate material. The silanizing surface treatment may include at least one siloxane. In general, siloxanes are any of a class of organic or inorganic chemical compounds comprising silicon, oxygen, and often carbon and hydrogen, based on the general empirical formula of $R_2SiO$, where R may be an alkyl group. Exemplary siloxanes include, but are not limited to, dimethylsiloxane, methylphenylsiloxane, methylhydrogen siloxane, methylhydrogen polysiloxane, methyltrimethoxysilane, octamethylcyclotetrasiloxane, hexamethyldisiloxane, diphenylsiloxane, and copolymers or blends of copolymers of any combination of monophenylsiloxane units, diphenylsiloxane units, phenylmethylsiloxane units, dimethylsiloxane units, monomethylsiloxane units, vinylsiloxane units, phenylvinylsiloxane units, methylvinylsiloxane units, ethylsiloxane units, phenylethylsiloxane units, ethylmethylsiloxane units, ethylvinylsiloxane units, or diethylsiloxane units.

In some embodiments, the silanizing surface treatment may include at least one silane. In general, silanes and other monomeric silicon compounds have the ability to bond to inorganic materials, such as the inorganic particulate material. The bonding mechanism may be aided by two groups in the silane structure, where, for example, the $Si(OR_3)$ portion interacts with the inorganic particulate material, while the organofunctional (vinyl-, amino-, epoxy-, etc.) group may interact with other materials.

In one embodiment, the inorganic particulate material is subjected to at least one surface treatment surface-treated with at least one ionic silane. Exemplary ionic silanes include, but are not limited to, 3-(trimethoxysilyl) propylethylenediamine triacetic acid trisodium salt and 3-(trihydroxysilyl)propylmethylphosphonate salt. In another embodiment, the inorganic particulate material is subjected to at least one surface treatment with at least one nonionic silane.

In a further embodiment, the inorganic particulate material is subjected to at least one surface treatment with at least one silane of Formula (I):

wherein:
$R^1$ is any hydrolysable moiety that may chemically react with any active group on the surface of the inorganic particulate material, including, but not limited to, alkoxy, halogen, hydroxy, aryloxy, amino, amide, methacrylate, mercapto, carbonyl, urethane, pyrrole, carboxy, cyano, aminoacyl, acylamino, alkyl ester, and aryl ester;

X has a value between 1 and 3, such that more than one siloxane bond may be formed between the inorganic particulate material and the at least one silane;

$R^2$ is any carbon-bearing moiety that does not substantially react or interact with the inorganic particulate material during the treatment process, including, but not limited to, substituted or unsubstituted alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, and arylalkaryl;

$R^3$ is any organic-containing moiety that remains substantially chemically attached to the silicon atom of Formula (I) once the at least one surface treatment is completed and that is capable of reacting or interacting with an active ingredient, such as, but not limited to, hydrogen, alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, arylalkaryl, alkoxy, halogen, hydroxy, aryloxy, amino, amide, methacrylate, mercapto, carbonyl, urethane, pyrrole, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium; wherein the hydrogen of said alkyl, alkenyl, aryl, cycloalkyl, cycloalkenyl, heteroaryl, and heterocyclic is optionally substituted by, for example, halogen, hydroxy, amino, carboxy, or cyano.

In some embodiments, the inorganic particulate material with a hydroxyl-bearing porous surface is subjected to at least one surface treatment with at least one silane, such that the inorganic particulate material surface is chemically bonded to the at least one silane. In such an embodiment, the surface area of the inorganic particulate material may limit the amount of the bound silane. As a result, it may be preferable to subject the inorganic particulate material to at least one physical surface treatment that increases the surface area of the inorganic particulate material prior to treatment with the at least one silane.

In some embodiments, silanization may proceed according to "wet" or "dry" silanization processes known to the skilled artisan. For example, a "wet" silanization process generally includes reacting the at least one silane onto the inorganic particulate material in at least one solvent (e.g., organic solvent or water). In some embodiments, heat may be used in place of, or in addition to, the at least one solvent. Although heat and solvents are not required for a "wet" silanization process, they may improve the reaction rate and promote uniform surface coverage of the treatment. In another embodiment, a "wet" silanization process includes in-line mixing of slurries or liquids during typical silanization processing steps, including but not limited to filtration and drying.

In some embodiments, a "dry" silanization process generally includes reacting at least one silane with the inorganic particulate material in a vapor phase by mixing the at least one silane with the inorganic particulate material and then heating the mixture. In some embodiments, a "dry" silanization process includes reacting at least one silane with the inorganic particulate material in a stirred liquid phase by mixing the at least one silane with the inorganic particulate material and then heating the mixture. In still other embodiments, a "dry" silanization process includes mixing at least one silane with the inorganic particulate material and incubating in a sealed container at elevated temperatures to speed up the surface treatment process. In yet other embodiments, the "dry" silanization process includes mixing the inorganic particulate material and a liquid silane additive, where the amount of silane added is small enough that the reaction mass remains solid-like and can continue to be processed like a dry particulate material.

In certain embodiments, the inorganic particulate material is subjected to at least one surface treatment with at least one silane by adding the at least one silane gradually to a rapidly stirred solvent, which is in direct contact with the inorganic particulate material. In another embodiment, the inorganic particulate material is subjected to at least one surface treatment with at least one silane by carrying out the treatment in a vapor phase, which causes the vapor of the at least one silane to contact and react with the inorganic particulate material.

According to some embodiments, a surface treatment, such as, for example, silicone oil, siloxane, or silane, may polymerize onto the inorganic particulate material. The treated inorganic particulate material may then be deagglomerated, if needed.

In certain embodiments, the inorganic particulate material may have a Hegman of about 5.5 or less, as measured by ASTM D1210.

In some embodiments, the inorganic particulate material may have a brightness of 95 or less, as measured using Hunter Colorimeter Models D-25A-9 or DP 9000.

In some embodiments, the inorganic particulate material may have a BET surface area of at least about 0.3 square meters/gram. For example, the inorganic particulate material may have a BET surface area of at least about 0.4 square meters/gram, at least about 0.5 square meters/gram, or at least about 0.6 square meters/gram.

In some embodiments, the treated inorganic particulate material may be a ground inorganic particulate material, such as, for example, a dry ground inorganic particulate material or a wet ground inorganic particulate material.

In certain embodiments, the mine rock dust may also include an untreated inorganic particulate material blended with the treated inorganic particulate material. In particular embodiments, the moisture tolerant mine rock dust may include a blend of coarse untreated inorganic particulate material such as, for example, talc, limestone (e.g., ground calcium carbonate (GCC), ground calcite, ground dolomite), chalk, marble, and fine treated inorganic particulate material such as talc, lime, limestone (e.g., GCC, ground calcite, ground dolomite). In other embodiments, the untreated inorganic particulate may include lime, gypsum, diatomaceous earth, perlite, hydrous or calcined kaolin, attapulgite, bentonite, montmorillonite, and other natural or synthetic clays. In some embodiments, blending a fine treated ground limestone with a coarser untreated limestone results in a mine rock dust that exhibits some hydrophobic properties and less caking when put in contact with water versus untreated limestone alone.

In some embodiments, the amount of dispersion of a moisture tolerant mine rock dust may be measured by applying a light blast of air, as per 30 C.F.R. § 75.2. According to some embodiments, the light blast of air may be applied after the mine rock dust has been wetted. According to some embodiments, the light blast of air may be applied after the mine rock dust has been wetted and dried. According to some embodiments, the mine rock dust will not form a cake that will not be dispersed into separate particles by a light blast of air. The amount of dispersion may be measured by the amount of weight of powder lost relative to the amount of powder prior to dispersing.

According to some embodiments, the mine rock dust may have an amount of dispersion greater than or equal to about 0.1% by weight. For example, the mine rock dust may have an amount of dispersion greater than or equal to about 1% by weight, greater than or equal to about 2% by weight, greater than or equal to about 3% by weight, greater than or equal to about 4% by weight, greater than or equal to about 5% by weight, greater than or equal to about 6% by weight, greater than or equal to about 7% by weight, greater than or equal to about 8% by weight, greater than or equal to about 9% by weight, greater than or equal to about 10% by weight, greater than or equal to about 11% by weight, greater than or equal to about 12% by weight, greater than or equal to about 13% by weight, greater than or equal to about 14% by weight, greater than or equal to about 15% by weight, greater than or equal to about 16% by weight, greater than or equal to about 17% by weight, greater than or equal to about 18 by weight, greater than or equal to about 19% by weight, greater than or equal to about 20% by weight, greater than or equal to about 21% by weight, greater than or equal to about 22% by weight, greater than or equal to about 23% by weight, greater than or equal to about 24% by weight, greater than or equal to about 25% by weight, greater than or equal to about 26% by weight, greater than or equal to about 27% by weight, greater than or equal to about 28% by weight, greater than or equal to about 29% by weight, or greater than or equal to about 30% by weight. According to some embodiments, the dispersion may be determined after 0 days, 7 days, 14 days, or 21 days after placing the mine rock dust in a chamber, such as, for example, a humidity chamber, dispersion testing chamber, or mine. According to some embodiments, the dispersion of the mine rock dust may be measured after a wet-applied mine rock dust has dried. According to some embodiments, the dispersion of the mine rock dust may be measured when the mine rock dust is still in a wet form. According to some embodiments the dispersion of the mine rock dust may be measured when the mine rock dust has a moisture content such that moisture is still present between the mine rock dust particles in the applied mine rock dust. According to some embodiments the dispersion of the mine rock dust may be measured when the mine rock dust has at least partially dried.

According to some embodiments, the anti-caking properties of the moisture tolerant mine rock dust may be measured using a Proctor test, such as ASTM D698-12. When measured using a Proctor test, the mine rock dust may fail to incorporate water. For example, the mine rock dust may fail to incorporate water such that it does not clump or hold together sufficiently to conduct the Proctor test. The mine rock dust may not pack or mix when subjected to a Proctor test.

According to some embodiments, the moisture tolerant mine rock dust may include a treated inorganic particulate material, such as, for example, an inorganic particulate material having at least one surface treatment. According to some embodiments, the moisture tolerant mine rock dust may include an untreated inorganic particulate material.

According to some embodiments, the moisture tolerant mine rock dust may include a blended mine rock dust. The blended mine rock dust may include a treated inorganic particulate material. The blended mine rock dust may also include an untreated inorganic particulate material.

According to some embodiments, the mine rock dust may have a moisture pick-up of less than or equal to about 10% by weight relative to the starting weight of the mine rock dust. For example, the mine rock dust may have a moisture pick-up less than or equal to about 9% by weight, less than or equal to about 8% by weight, less than or equal to about 7% by weight, less than or equal to about 6% by weight, less than or equal to about 5% by weight, less than or equal to about 4% by weight, less than or equal to about 3% by weight, less than or equal to about 2% by weight, less than or equal to about 1% by weight relative to the starting weight of the mine rock dust. The moisture pick-up may be determined, for example, 7 days, 14 days, or 21 days after the mine rock dust is placed into a humidity chamber.

In some embodiments, the untreated inorganic particulate material may be ground inorganic particulate material, such as a dry ground inorganic particulate material or a wet ground inorganic particulate material.

In some embodiments, the mine rock dust has a contact angle in a range from about 10 to about 150 degrees. According to some embodiments, the mine rock dust has a contact angle in a range from about 25 to about 125 degrees, from about 50 to about 100 degrees, or from 90 to about 150 degrees. Contact angle may be measured by a test according to ASTM D7334-08.

In some embodiments, the blended treated inorganic particulate material and untreated inorganic particulate material has a contact angle in a range from about 10 to about 150 degrees. According to some embodiments, the blended material has a contact angle in a range from about 25 to about 125 degrees, from about 50 to about 100 degrees, or from 90 to about 150 degrees.

According to some embodiments, the treated inorganic particulate material may have a contact angle in a range from about 10 to about 150 degrees, such as, for example, from about 25 to about 125 degrees, from about 50 to about 100 degrees, or from about 90 to about 150 degrees.

Without wishing to be bound by a particular theory, it is believed that a ratio of the treated inorganic particulate material to untreated inorganic particulate material may be proportioned to vary the amount of un-reacted surface treatment in a blend. In certain embodiments, surface-treated ground calcium carbonate may be used to provide a hydrophobic property to the rock dust. Without wishing to be bound by a particular theory, addition of a surface treatment, such as stearic acid, may result in minimal "free acid" after treatment. The reaction of stearic acid with the limestone surface may create calcium or magnesium stearate. The melting point of stearic acid is approximately 157° F. (69.4° C.), and the melting point of calcium stearate is approximately 311° F. (155° C.).

According to some embodiments, calcium carbonate is combined (e.g., blended) at room temperature with stearic acid (or salts thereof, esters thereof, or mixtures thereof) and water in an amount greater than about 0.1% by weight relative to the total weight of the mixture (e.g., in the form of a cake-mix). The mixture may be blended at a temperature sufficient for at least a portion of the stearic acid to react (e.g., sufficient for a majority of the stearic acid to react with at least a portion of the calcium carbonate). For instance, the mixture may be blended at a temperature sufficient such that at least a portion of the stearic acid may coat at least a portion of the calcium carbonate (e.g., the surface of the calcium carbonate).

In some embodiments, the mixture may be blended at a temperature high enough to melt the stearic acid. For example, the mixture may be blended at a temperature ranging from about 149° F. (65° C.) to about 392° F. (200° C.). In other embodiments, the mixture may be blended at a temperature ranging from about 149° F. (65° C.) to about 302° F. (150° C.), for example, at about 248° F. (120° C.). In further embodiments, the mixture may be blended at a temperature ranging from about 149° F. (65° C.) to about 212° F. (100° C.). In still other embodiments, the mixture may be blended at a temperature ranging from about 149° F. (65° C.) to about 194° F. (90° C.). In further embodiments, the mixture may be blended at a temperature ranging from about 158° F. (70° C.) to about 194° F. (90° C.).

In certain embodiments, the amount of surface treatment may be combined with the inorganic particulate material, such as, for example, calcium carbonate, below, at, or in excess of, a monolayer concentration. "Monolayer concentration," as used herein, refers to an amount sufficient to form a monolayer on the surface of the inorganic particles. Such values will be readily calculable to one skilled in the art based on, for example, the surface area of the inorganic particles.

In some embodiments, the surface treatment may be added to calcium carbonate in an amount greater than or equal to about one times the monolayer concentration. In other embodiments, the surface treatment may be added in an amount in excess of about one times the monolayer concentration, for example, two times to six times the monolayer concentration.

According to some embodiments, blends of the moisture tolerant mine rock dust may include an inorganic particulate material having at least a monolayer concentration of a surface treatment and may also include an inorganic particulate material having less than a monolayer concentration of a surface treatment. The surface treatment of the monolayer concentration may be the same or different from the surface treatment having less than a monolayer concentration.

In certain embodiments, the inorganic particles may be characterized by a median particle size ($d_{50}$) value, defined as the size at which 50 percent of the calcium carbonate particles have a diameter less than or equal to the stated value. Particle size measurements, such as $d_{50}$, may be carried out by any means now or hereafter known to those having ordinary skill in the art.

Particle sizes, and other particle size properties, of the untreated inorganic particulate material referred to in the present disclosure, may be measured using a SEDIGRAPH 5100 instrument, as supplied by Micromeritics Corporation. The size of a given particle is expressed in terms of the diameter of a sphere of equivalent diameter, which sediments through the suspension, i.e., an equivalent spherical diameter or esd.

The particle size and other particle size properties of the treated inorganic particulate material may be determined by a Microtrac Model X100 Particle Size Analyzer, as supplied by Microtrac. The Microtrac analysis determines particle size based on the number distribution of particles using a laser light scattering technique.

In some embodiments, the particle size as determined by SEDIGRAPH 5100 may not be the same as that determined by a Microtrac Model X100 Particle Size Analyzer. The difference may be due to the different methods used by each instrument to determine the particle size. The SEDIGRAPH 5100 measures the sedimentation of particles over time, whereas the Microtrac Model X100 Particle Size Analyzer analyzes a laser light scattering pattern using a specific algorithm.

According to some embodiments, a treated inorganic particulate material and an untreated inorganic particulate material have the same particle size distribution (psd) in a blend. The psd of the fine particles may be similar to, or the same as, the psd of the coarse portion of the mine rock dust. The psd of a treated particles may be similar to, or the same as, the psd of an untreated portion of the mine rock dust.

In certain embodiments, when the exemplary mine rock dust included a blend of treated and untreated inorganic particulate materials, a treated inorganic particulate material and a untreated inorganic particulate material may have the same, substantially the same, or similar particle size distributions. According to some embodiments, the treated inorganic particulate material and the untreated inorganic particulate material may have different particle size distributions. For example, the treated al inorganic particulate material may have a larger particle size distribution than the untreated inorganic particulate material, such as, for example, a larger median or mean particle size and/or a broader overall size distribution. In other embodiments, the treated inorganic particulate material may have a smaller particle size distribution that the untreated inorganic particulate material, such as, for example, a smaller median or mean particle size and/or a narrower overall size distribution. When the treated and untreated inorganic particulate materials have different distributions, the mine rock dust may have, for example, a bimodal or multimodal distribution of particle sizes. In certain embodiments, the first treated inorganic particulate material and the second treated inorganic particulate material may have the same, substantially the same, or similar particle size distributions, such as, for example, bimodal particle size distributions.

Also, without wishing to be bound by a particular theory, the median particle sizes of a coarse untreated portions, or of different treated portions, of a mine rock dust blend may be chosen based on their potential to pack with the median particle size of the specific treated fine portions of the rock dust used in that blend. An advantage of blending the smaller particles with the larger particles may be that the voids between the larger particles that would wick moisture into the blend are reduced or avoided. In certain embodiments, particle-packing practice may be used to inhibit the wicking action of surface water through the compositions.

According to some embodiments, the amount of free stearic acid associated with a stearic acid-treated calcium carbonate composition may be less than about 20% relative to the monolayer concentration. According to other embodiments, the amount of free stearic acid associated with a stearic acid-treated calcium carbonate composition may be less than about 15% free stearic acid. According to further embodiments, the amount of free stearic acid associated with a stearic acid-treated calcium carbonate composition may be less than about 10% free stearic acid, less than about 7% free stearic acid, less than about 6% free stearic acid, less than about 5% free stearic acid, less than about 4% free stearic acid, less than about 3% free stearic acid, less than about 2% free stearic acid, or less than about 1% free stearic acid. In still further embodiments, no free stearic acid may be associated with a stearic acid-treated calcium carbonate composition. "No free stearic acid," as used herein, refers to no stearic acid being detectable by the ToF-SIMS, TGA, and/or DSC techniques described herein.

An exemplary anti-caking, moisture tolerant mine rock dust is now described. The mine rock dust may be such that a minimum of 70% of the particles passes through a 200 mesh. In some embodiments, the $d_{50}$ ranges from about 10 to about 50 microns; no more than about 0.4 wt % stearic acid is present (without wishing to be bound by a particular theory, too much stearic acid may affect whether the mine rock dust will adhere properly to the mine walls and ceilings); and the ratio of the fine treated portion to the coarse untreated portion ranges from 10:90 to 75:25. The fine portion may be treated with stearic acid, silicone oil, siloxane, or silane. For the stearic acid treatment, it is preferred to have reacted stearate on the inorganic particulate material, as it has a higher melting point (311° F.) relative to unreacted (free) stearic acid (157° F.). By having less of the lower melting point material, less flashing of the treatment occurs during an explosion or increase in temperature when the composition is in use. Thus, the rock mine dust will be more effective in abating an explosion.

In certain embodiments, the treatment level ranges from 0.01 wt % to 5.0 wt %, for example, from 0.1 wt % to 2.5 wt % based on the weight of the inorganic particulate material.

For instance, the fatty acid, salt thereof, or ester thereof may be present in treatment level ranges from 0.1 wt % to 2.5 wt % based on the weight of the inorganic particulate material. The fatty acid, salt thereof, or ester thereof may be present in an amount of not more than 0.2 wt %, not more than 0.3 wt %, not more than 0.4 wt %, not more than 0.5 wt %, not more than 0.6 wt %, not more than 0.7 wt %, not more than 0.8 wt %, not more than 0.9 wt %, not more than 1.0 wt %, not more than 1.1 wt %, not more than 1.2 wt %, not more than 1.25 wt %, not more than 1.3 wt %, not more than 1.4 wt %, not more than 1.5 wt %, not more than 1.6 wt %, not more than 1.7 wt %, not more than 1.8 wt %, not more than 1.9 wt %, not more than 2.0 wt %, not more than 2.1 wt %, not more than 2.2 wt %, not more than 2.3 wt %, not more than 2.4 wt %, or not more than 2.5 wt % based on the weight of the inorganic particulate material.

For instance, the silicone oil, siloxane, or silane may be present in treatment level ranges from 0.01 wt % to 5.0 wt % based on the weight of the inorganic particulate material.

The silicon oil, siloxane, or silane may be present in an amount of not more than 0.05 wt %, not more than 0.1 wt %, not more than 0.2 wt %, not more than 0.3 wt %, not more than 0.4 wt %, not more than 0.5 wt %, not more than 0.6 wt %, not more than 0.7 wt %, not more than 0.8 wt %, not more than 0.9 wt %, not more than 1.0 wt %, not more than 1.1 wt %, not more than 1.2 wt %, not more than 1.25 wt %, not more than 1.3 wt %, not more than 1.4 wt %, not more than 1.5 wt %, not more than 1.6 wt %, not more than 1.7 wt %, not more than 1.8 wt %, not more than 1.9 wt %, not more than 2.0 wt %, not more than 2.1 wt %, not more than 2.2 wt %, not more than 2.3 wt %, not more than 2.4 wt %, not more than 2.5 wt %, not more than 3.0 wt %, not more than 3.5 wt %, not more than 4.0 wt %, not more than 4.5 wt %, or not more than 5.0 wt % based on the weight of the inorganic particulate material.

In certain embodiments, a treated inorganic particulate material $d_{50}$ ranges from 1 to 15 microns. In other embodiments, a treated inorganic particulate material $d_{50}$ ranges from 0.5 to 75 microns, from 1 to 60 microns, from 1 to 50 microns, or from 1 to 30 microns.

According to some embodiments, an untreated inorganic particulate material $d_{50}$ ranges from 3 to 75 microns, for example, from 10 to 75 microns, from 12 to 75 microns, from 20 to 75 microns, from 25 to 75 microns, from 30 to 75 microns, from 5 to 50 microns, or from 10 to 50 microns.

In certain embodiments, the ratio of treated inorganic particulate material to untreated inorganic particulate material ranges from about 1:99 to about 99:1, for example, from about 3:97 to about 97:3, 5:95 to about 95:5, from about 10:90 to about 90:10, from about 20:80 to about 80:20, from about 25:75 to about 75:25, or less than about 50:50.

Three example mine rock dusts may be prepared according to the this disclosure:
1. 50% coarse (12-18 micron) ground limestone with 50% 3 micron median stearate-treated ground limestone blend;
2. 25% coarse (12-18 micron) ground limestone with 75% 3 micron median stearate-treated ground limestone blend; and
3. 75% coarse (12-18 micron) ground limestone with 25% 3 micron median stearate-treated ground limestone blend.

The exemplary mine rock dusts may be applied to a mine surface in a wet form.

In some embodiments, the ground calcium carbonate is prepared by attrition grinding. "Attrition grinding," as used herein, refers to a process of wearing down particle surfaces resulting from grinding and shearing stress between the moving grinding particles. Attrition can be accomplished by rubbing particles together under pressure, such as by a gas flow.

In some embodiments, the attrition grinding is performed autogenously, where the calcium carbonate particles are ground only by other calcium carbonate particles.

In another embodiment, the calcium carbonate is ground by the addition of a grinding media other than calcium carbonate. Such additional grinding media can include ceramic particles (e.g., silica, alumina, zirconia, and aluminum silicate), plastic particles, or rubber particles.

In some embodiments, the calcium carbonate is ground in a mill. Exemplary mills include those described in U.S. Pat. Nos. 5,238,193 and 6,634,224, the disclosures of which are incorporated herein by reference. As described in these patents, the mill may comprise a grinding chamber, a conduit for introducing the calcium carbonate into the grinding chamber, and an impeller that rotates in the grinding chamber thereby agitating the calcium carbonate.

In some embodiments, the calcium carbonate is dry ground, where the atmosphere in the mill is ambient air. In some embodiments, the calcium carbonate may be wet ground.

In some embodiments, the mine rock dust may have a range of contact angles from 10 to 150 degrees, from 25 to 125 degrees, from 50 to 100 degrees, or from 90 to 150 degrees. For example, a stearate-treated calcium carbonate may be blended with an untreated calcium carbonate in a ratio (treated:untreated) of 12.5:87.5. The treated calcium carbonate may be treated with 1.15 wt % of stearate and may have a $d_{50}$ value of 3.3 microns, as measured by Microtrac laser light diffraction. The untreated calcium carbonate may have a $d_{50}$ value of 22.5 microns, as measured by a SEDIGRAPH 5100. The exemplary mine rock dust composition has a contact angle of 93 degrees at 35% relative humidity, and 95.5 degrees at 98% relative humidity.

In some embodiments, a feed calcium carbonate (prior to milling) may include calcium carbonate sources chosen from calcite, limestone, chalk, marble, dolomite, or other similar sources. Ground calcium carbonate particles may be prepared by any known method, such as by conventional grinding techniques discussed above and optionally coupled with classifying techniques, e.g., jaw crushing followed by roller milling or hammer milling and air classifying or mechanical classifying.

The ground calcium carbonate may be further subjected to an air sifter or hydrocyclone. The air sifter or hydrocyclone can function to classify the ground calcium carbonate and remove a portion of residual particles greater than 20 microns. According to some embodiments, the classification can be used to remove residual particles greater than 10 microns, greater than 30 microns, greater than 40 microns, greater than 50 microns, or greater than 60 microns. According to some embodiments, the ground calcium carbonate may be classified using a centrifuge, hydraulic classifier, or elutriator.

In some embodiments, the ground calcium carbonate disclosed herein is free of dispersant, such as a polyacrylate. In another embodiment, a dispersant may be present in a sufficient amount to prevent or effectively restrict flocculation or agglomeration of the ground calcium carbonate to a desired extent, according to normal processing requirements. The dispersant may be present, for example, in levels up to about 1% by weight. Examples of dispersants include polyelectrolytes such as polyacrylates and copolymers containing polyacrylate species, especially polyacrylate salts (e.g., sodium and aluminium optionally with a group II metal salt), sodium hexametaphosphates, non-ionic polyol, polyphosphoric acid, condensed sodium phosphate, non-ionic surfactants, alkanolamine, and other reagents commonly used for this function.

A dispersant may be selected from conventional dispersant materials commonly used in the processing and grinding of inorganic particulate materials, such as calcium carbonate. Such dispersants will be recognized by those skilled in this art. Dispersants are generally water-soluble salts capable of supplying anionic species, which in their effective amounts may adsorb on the surface of the inorganic particles and thereby inhibit aggregation of the particles. The unsolvated salts may suitably include alkali metal cations, such as sodium. Solvation may in some cases be assisted by making the aqueous suspension slightly alkaline. Examples of suitable dispersants also include water soluble condensed phosphates, for example, polymetaphosphate salts (general form of the sodium salts: $(NaPO_3)_x$), such as tetrasodium metaphosphate or so-called "sodium hexametaphosphate" (Graham's salt); water-soluble salts of polysilicic acids; polyelectrolytes; salts of homopolymers or copolymers of acrylic acid or methacrylic acid; and/or salts of polymers of other derivatives of acrylic acid, suitably having a weight average molecular mass of less than about 20,000. Sodium hexametaphosphate and sodium polyacrylate, the latter suitably having a weight average molecular mass in the range of about 1,500 to about 10,000, are preferred.

In certain embodiments, the production of the ground calcium carbonate includes using a grinding aid, such as propylene glycol, or any grinding aid known to those skilled in the art.

According to some embodiments, the ground calcium carbonate may be combined with coal dust. At least some of the ground calcium carbonate compositions disclosed may effectively render coal dust inert, as shown by an explosibility test.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of inerting coal dust, comprising:
combining a surface-treated hydrophobic inorganic particulate material with water to form a mine rock dust composition;
applying the mine rock dust composition in the form of a non-foaming slurry;
wherein the surface of the inorganic particulate material is treated with a fatty acid, salt thereof, or ester thereof; and
wherein the surface treatment level of the inorganic particulate material ranges from 0.1 wt % to 5.0 wt % based on the weight of the inorganic particulate material.

2. The method of claim 1, wherein the method does not include applying a mine rock dust composition in a dry form after applying the step of applying the mine rock dust in the form of a slurry.

3. The method of claim 1, wherein applying the mine rock dust composition comprises applying a slurry including the hydrophobic inorganic particulate material.

4. The method of claim 3, wherein applying the slurry comprises an aerated slurry.

5. The method of claim 1, further comprising, after applying the mine rock dust composition, dispersing the mine rock dust with a light blast of air.

6. The method of claim 1, the mine rock dust composition has a dispersion greater than or equal to about 0.1% by weight.

7. The method of claim 1, wherein the hydrophobic inorganic particulate material comprises an inorganic particulate material treated with at least one hydrophobic treatment.

8. The method of claim 1, wherein the mine rock dust composition further comprises an untreated inorganic particulate material.

9. The method of claim 1, wherein the hydrophobic inorganic particulate material has a contact angle ranging from about 90 to about 150 degrees; wherein the contact angle is measured by a test according to ASTM D7334-08.

10. The method of claim 1, applying the mine rock dust composition in an amount sufficient to render coal dust explosively inert according to a 20-L explosibility test.

11. The method of claim 1, applying the mine rock dust composition in an amount sufficient to abate explosions of coal dust.

12. A method of applying a mine rock dust composition, comprising:
combining a surface-treated hydrophobic inorganic particulate material with water to form a mine rock dust composition;
applying the mine rock dust composition in the form of a non-foaming slurry at a concentration having no respirable mine rock dust;
wherein the mine rock dust composition renders coal dust explosively inert;
wherein the surface of the inorganic particulate material is treated with a fatty acid, salt thereof, or ester thereof; and
wherein the surface treatment level of the inorganic particulate material ranges from 0.1 wt % to 5.0 wt % based on the weight of the inorganic particulate material.

13. The method of claim 12, wherein the mine rock dust is capable of being dispersed with a blast of air.

* * * * *